United States Patent
Bellet et al.

(10) Patent No.: US 9,235,867 B2
(45) Date of Patent: Jan. 12, 2016

(54) CONCURRENT MEDIA DELIVERY

(71) Applicant: MICROSOFT TECHNOLOGY LICENSING, LLC, Redmond, WA (US)

(72) Inventors: Vincent Bellet, Seattle, WA (US); Manuel Millot, Saint-Germain-en-Laye (FR); Damien Auroux, Paris (FR); Aaron Greene, Paris (FR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 398 days.

(21) Appl. No.: 13/712,412

(22) Filed: Dec. 12, 2012

(65) Prior Publication Data

US 2013/0326041 A1 Dec. 5, 2013

Related U.S. Application Data

(60) Provisional application No. 61/655,406, filed on Jun. 4, 2012.

(51) Int. Cl.
*G06F 15/173* (2006.01)
*G06Q 50/18* (2012.01)
(Continued)

(52) U.S. Cl.
CPC ........ *G06Q 50/184* (2013.01); *G06F 17/30053* (2013.01); *G06F 17/30106* (2013.01); *G06F 17/30174* (2013.01); *G06Q 30/0256* (2013.01); *H04L 65/4084* (2013.01); *H04L 65/60* (2013.01)

(58) Field of Classification Search
CPC . H04L 65/60; H04L 65/4084; H04L 41/0213; H04L 29/08072; H04L 29/06; H04L 41/22; H04L 41/12; G06Q 50/184; G06Q 30/0256; G06F 17/30106; G06F 17/30174; G06F 17/30053
USPC .................................. 709/217, 223–229, 240
See application file for complete search history.

(56) References Cited

U.S. PATENT DOCUMENTS

| 6,545,209 | B1 | 4/2003 | Flannery et al. |
| 8,463,933 | B2 * | 6/2013 | Harrang et al. ............... 709/232 |

(Continued)

OTHER PUBLICATIONS

Wu, Dapeng, Yiwei Thomas Hou, Wenwu Zhu, Ya-Qin Zhang, and Jon M. Peha. "Streaming video over the Internet: approaches and directions." Circuits and Systems for Video Technology, IEEE Transactions on 11, No. 3 (2001): 282-300.*

(Continued)

*Primary Examiner* — Liangche A Wang
*Assistant Examiner* — Melaku Habtemariam
(74) *Attorney, Agent, or Firm* — Bryan Webster; Judy Yee; Micky Minhas (57) ABSTRACT

Various embodiments relating to managing media delivery are disclosed. In one embodiment, a first request is received from a first device associated with a first account to obtain a first media content item. The first request may include an identifier indicating that the first request is an automatic request or a manual request. Information for obtaining the first media content item is sent to the first device. A second request is received from a second device associated with the first account to obtain a second media content item. The second request may include an identifier indicating that the second request is a manual request. Information for obtaining the second media content item is sent to the second device, such that obtaining the first media content item on the first device temporally overlaps obtaining the second media content item on the second device.

20 Claims, 5 Drawing Sheets

(51) Int. Cl.
  *G06Q 30/02* (2012.01)
  *G06F 17/30* (2006.01)
  *H04L 29/06* (2006.01)

(56) References Cited

U.S. PATENT DOCUMENTS

| | | | | |
|---|---|---|---|---|
| 2005/0278760 | A1* | 12/2005 | Dewar et al. | 725/94 |
| 2007/0282949 | A1  | 12/2007 | Fischer et al. | |
| 2008/0059989 | A1* | 3/2008  | O'Connor et al. | 725/9 |
| 2008/0083025 | A1  | 4/2008  | Meijer et al. | |
| 2008/0091613 | A1  | 4/2008  | Gates et al. | |
| 2009/0055530 | A1* | 2/2009  | Pince et al. | 709/224 |
| 2010/0153576 | A1* | 6/2010  | Wohlert et al. | 709/231 |
| 2010/0198944 | A1* | 8/2010  | Ho et al. | 709/217 |
| 2011/0145750 | A1* | 6/2011  | Yodo et al. | 715/772 |
| 2013/0081110 | A1* | 3/2013  | McGowan | 726/4 |

OTHER PUBLICATIONS

Kesavan, et al., "Controlled Multimedia Cloud Architecture and Advantages", Retrieved at <<http://airccse.org/journal/acij/papers/0312acij04.pdf>>, Advanced Computing: An International Journal (ACIJ), Mar. 2012, pp. 12.

Kakkar, Manan, "What's Coming with Windows Phone 8 Xbox Music", Retrieved at <<http://techie-buzz.com/windows-phone/windows-phone-8-xbox.html>>, Jul. 31, 2012, pp. 7.

Raina, Sidharth, "Microsoft to announce Woodstock Online Music Streaming during E3 in June", Retrieved at <<http://airccse.org/journal/acij/papers/0312acij04.pdf>>, http://www.youthgoogly.com/microsoft-to-announce-woodstock-online-music-streaming-during-e3-in-june/637>>, Apr. 26, 2012, pp. 2.

Caldwell, Serenity, "iTunes Match: What you need to know", Retrieved at <<http://www.macworld.com/article/1163658/itunes_match_what_you_need_to_know.html, Nov. 16, 2011, pp. 15.

* cited by examiner

CONCURRENT MEDIA DELIVERY

CROSS REFERENCE TO RELATED APPLICATIONS

This application claims priority to U.S. Provisional Patent Application No. 61/655,406, filed Jun. 4, 2012 and entitled MULTI-SCREEN MEDIA DELIVERY, the entirety of which is hereby incorporated herein by reference for all purposes.

BACKGROUND

Concurrently streaming media to two or more different devices using the same account is often not allowed by content providers. One method of handling this licensing issue is to prevent any device from starting a stream if another device on the same account is currently streaming.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to managing concurrent delivery of media content to different devices associated with the same account are provided. In one embodiment, a first request may be received from a first device associated with an account to obtain a first media content item. The first request may include an identifier indicating that the first request is an automatic request or a manual request. Information for obtaining the first media content item may be sent to the first device. A second request may be received from a second device associated with the account to obtain a second media content item. The second request may include an identifier indicating that the second request is a manual request. Information for obtaining the second media content item may be sent to the second device, such that obtaining the first media content item on the first device temporally overlaps obtaining the second media content item on the second device.

DETAILED DESCRIPTION

Figure 1:
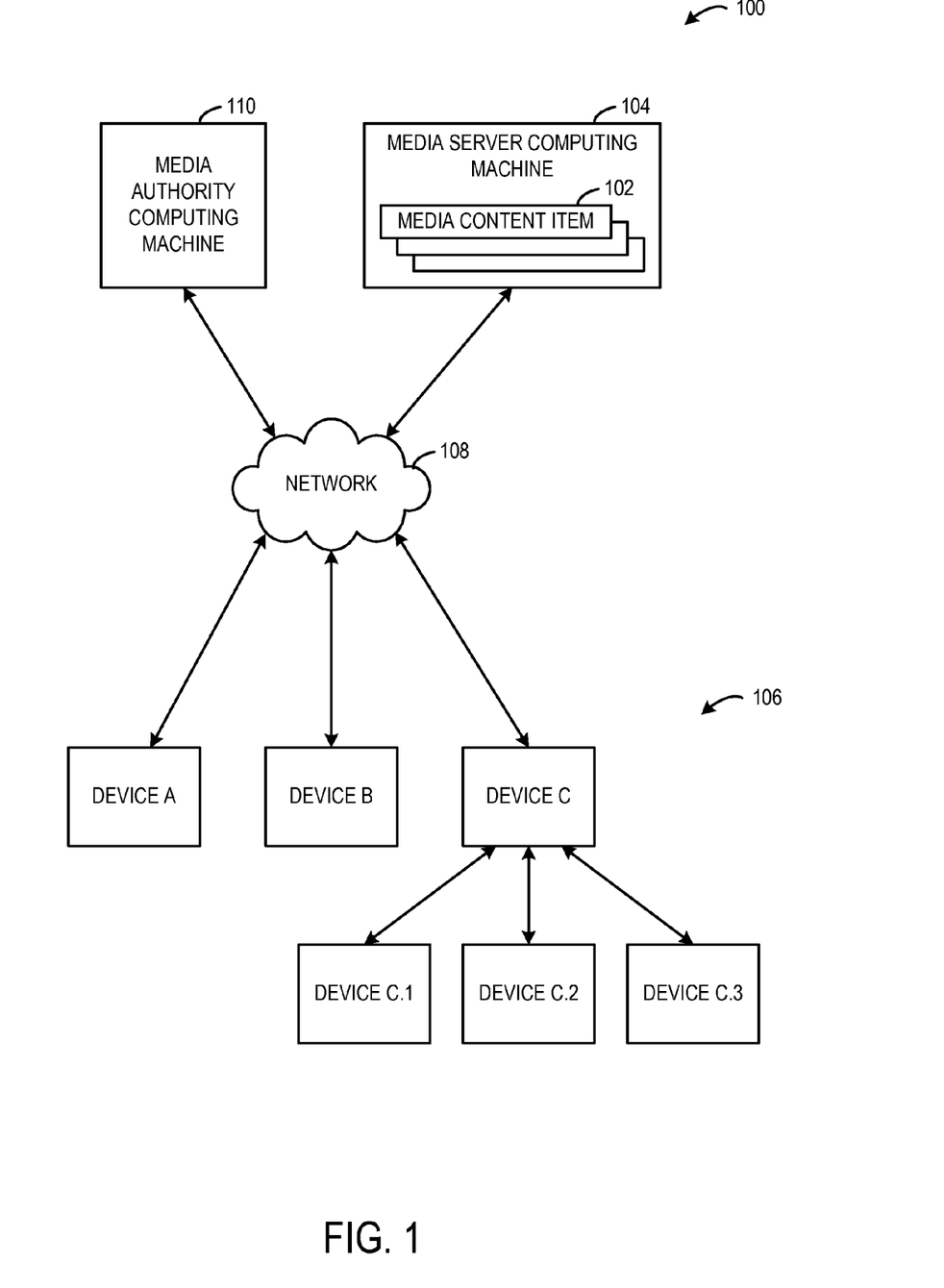
FIG. 1 shows a media delivery system in accordance with an embodiment of the present disclosure.

FIG. 1 shows a media delivery system 100 in accordance with an embodiment of the present disclosure. Media delivery system 100 is configured to provide media content items 102 (e.g., songs, movies, games, and the like) from one or more media serving computing machines 104 to a plurality of different playback devices 106 over a network 108, such as the Internet. The media content items may be persistently or temporarily downloaded for immediate playback (i.e., streaming), and/or the media content items may be persistently downloaded for playback at a later time.

As illustrated, media delivery system 100 includes playback device A, playback device B, master playback device C, and slave playback devices C.1, C.2, and C.3. In the case of the master-slave device configuration, it will be appreciated that each of the slave devices (e.g., C.1-C.3) may concurrently playback the same media content item (e.g., stream the same song) obtained by the master device (e.g., C). For the purposes of this discussion the master/slave configuration may be considered as a single device when determining concurrent delivery of media content from a media server computing machine. In other words, the slave devices may not be recognized for the purposes of concurrent delivery of media content since they do not interact with the media server computing machine directly to obtain the media content item. Rather, the slave devices merely interact with the master device to obtain the media content item. For example, the master device may be a media center computer and the slave devices may be wireless speaker modules distributed throughout a house. The media center computer may concurrently stream a playlist of songs to each of the speaker modules so that the same song may be played in different areas of the house at the same time.

It should be understood that virtually any number of different playback devices may be used to access media content items from virtually any number of different media serving computing machines without departing from the scope of this disclosure.

Media delivery system 100 includes a media authority computing machine 110 for controlling access to the media content items provided by media server computing machine 104. While media authority computing machine 110 and media server computing machine 104 are separate entities in FIG. 1, the media server computing machine may optionally incorporate the functionality of the media authority computing machine. Furthermore, scale, redundancy and/or performance may be improved by using a plurality of different computing machines in either or both of the authority or server capacities. When a plurality of different computing machines is used, such machines optionally may be located at different locations.

Access to the media content items may be dictated by any suitable membership model without departing from the scope of this disclosure. As a nonlimiting example, a paid membership may provide one month of access to all media content items in a library from any compatible playback device. Access may be provided according to the terms of an account. One or more devices may be associated with a particular account. As such, two or more different playback devices may be used to access media content items using the same account.

However, content providers may wish to severely limit different devices associated with the same account from concurrently obtaining media content items. If such concurrent acquisition was not limited, multiple users could share an account and effectively bypass the cost of owning an account while still receiving the full benefit.

At the same time, it is desirable to provide the best user experience possible. As such, if it can be assessed that a paying user is not attempting to unfairly share an account with a nonpaying user, but instead is fairly switching from one playback device to another, then it may be beneficial to allow different devices associated with the same account to concurrently obtain media content items in a limited fashion.

Figure 2:
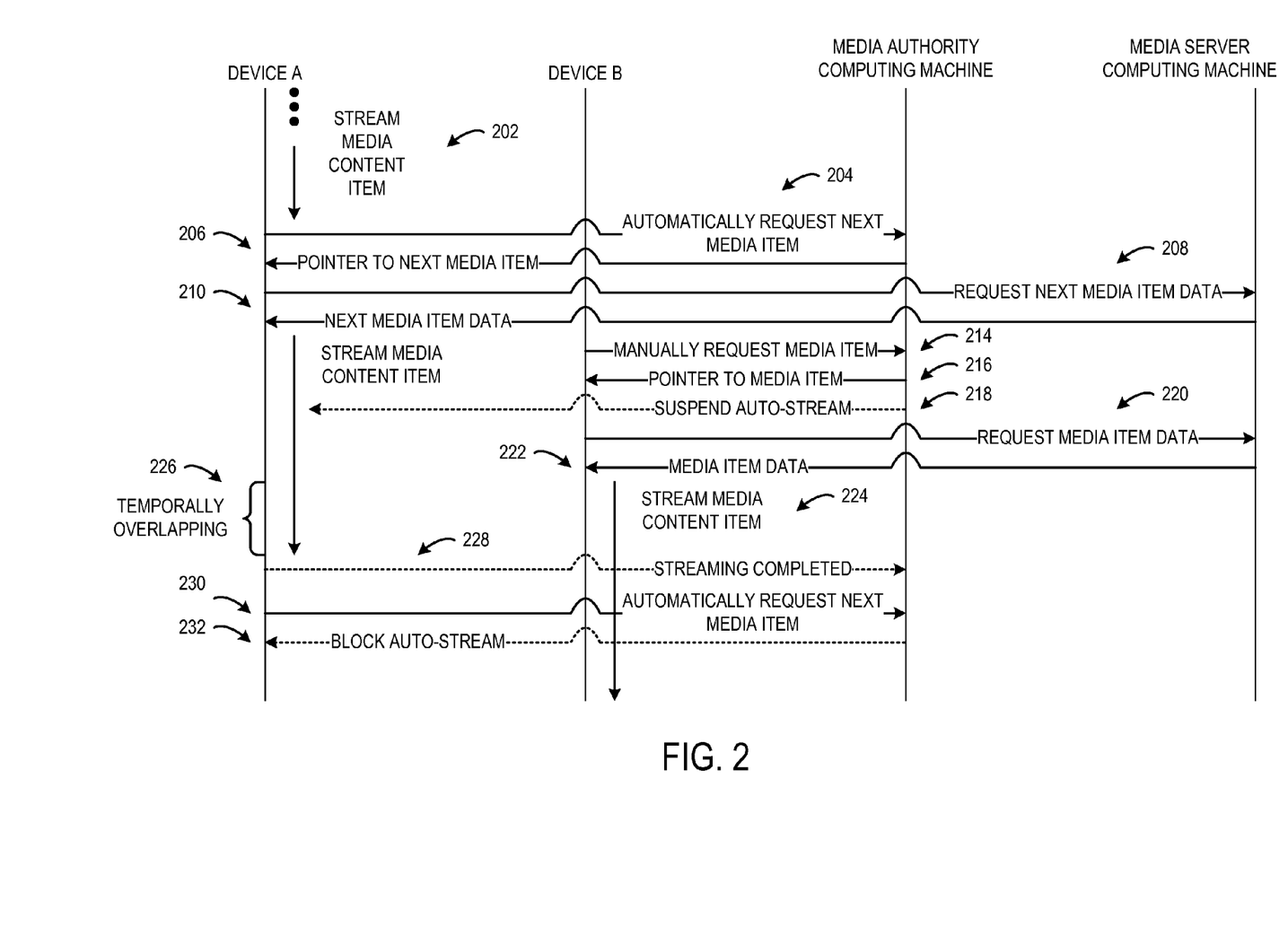
FIG. 2 shows an example scenario for managing media delivery to different devices associated with the same account.

FIG. 2 shows an example scenario in which the media authority computing machine 110 of the media delivery system 100 may manage media delivery to different playback devices associated with the same account to concurrently obtain media content items. At 202, playback device A is streaming a media content item from media server computing machine 104. In the illustrated scenario, playback device A is set for automatic or automated streaming. In other words, after completing streaming of one media content item, another media content item will automatically begin streaming without further manual user input. For example, the next song in a playlist may be streamed. As such, at 204, playback device A automatically sends a request for the next media content item to media authority computing machine 110.

As discussed below with reference to FIG. 3, upon receiving a request for a media content item, the media authority computing machine may determine whether to allow the requesting playback device to obtain the requested media content item. In particular, the media authority computing machine may be configured to limit unfair concurrent content acquisition while providing a favorable user experience.

In the present example, no other playback devices associated with the same account as playback device A are currently obtaining media content items, so the media authority computing machine allows playback device A to obtain the requested content. In particular, at 206, the media authority computing machine sends a pointer to the requested media content item to playback device A. The pointer points to a network location from which the media content item is available.

Once playback device A receives the pointer from the media authority computing machine, at 208, playback device A sends a request to the media server computing machine 104 to obtain the next media content item located at the location indicated by the pointer. At 210, the media server computing machine sends the requested media content item to playback device A. Upon obtaining the next media content item, at 212, playback device A begins streaming the next media content item.

While playback device A is streaming the next media content item, at 214, playback device B that is associated with the same account as playback device A manually sends a request for a media content item to media authority computing machine 110. For example, the request may be sent in response to user input that manually selects the media content item. It is to be understood that the media content item requested by playback device B is a distinct instance of a media content item that is different from an instance of a media content item being streamed by playback device A. However, each instance of the media content items may be the same or different. For example, the same song may be concurrently obtained by both playback devices.

The media authority computing machine may determine that a playback device (i.e., playback device A) from the same account as playback device B is being provided a media content item. However, since the request sent by playback device B is a manual request, the media authority computing machine allows provision of the media content item to playback device B. In other words, the manual request is prioritized over the automatic request. In particular, at 216, the media authority computing machine sends information (e.g., a pointer) for obtaining the requested media content item to playback device B. As used herein, a manual request is used to refer to a request that in consistent with active use by a user (e.g., playing a particular song selected by a user). In contrast, an automatic request is used to refer to a request that is consistent with automated playback that would have taken place without active use by a user (e.g., automatically playing one song after another).

Optionally, at 218, the media authority computing machine may send playback device A instructions to suspend automated streaming in response to receiving the manual request from a playback device (e.g., playback device B) associated with the same account. In some embodiments, playback device A may suspend automated streaming upon completing streaming of a currently streaming media content item.

Continuing with FIG. 2, once playback device B receives the pointer from the media authority computing machine, at 220, playback device B sends a request to the media server computing machine 104 to obtain the media content item located at the location of the pointer.

At 222, the media server computing machine sends the requested media content item to playback device B. Upon obtaining the media content item, at 224, playback device B begins streaming the media content item.

At 226, playback device A streams a media content item and playback device B concurrently streams a media content item, such that streaming of media content by devices associated with the same account is temporally overlapping.

After completing streaming of the next media content item, at 228, playback device A optionally may send an indication to the to the media authority computing machine that the media content item has completed streaming. The media authority computing machine may use the indication for determining concurrent streaming, incrementing a prevention criteria counter, or the like. In some scenarios, the indication may signal that a device stops streaming a song early, thus allowing the media authority computing machine to more accurately assess instances of concurrent streaming. For example, such an indication may be used to avoid triggering a prevention criterion, as discussed below with reference to FIG. 3.

If automatic streaming has not been suspended (e.g., at 218), at 230, playback device A automatically sends a request for the next media content item to the media authority computing machine. Upon receiving the automatic request from playback device A, at 232, the media authority computing machine blocks playback device A from obtaining the next media content item. The media authority computing machine blocks playback device A from obtaining media content in an automated fashion because playback device B is concurrently obtaining media content in a manual fashion that is prioritized over the automatic request of playback device A. In some embodiments, blocking includes refraining from sending to the playback device A information for obtaining the next media content item. In some embodiments, blocking includes sending instructions to playback device A to suspend automated streaming.

In the above described scenario, two different playback devices associated with the same account may concurrently obtain different media content items. In particular, one playback device automatically requests a media content item, and the other playback device manually requests a media content item. The media authority computing machine may allow provision of the media content item to the playback device that sends the manual request. Correspondingly, the media authority computing machine may block the playback device that sends the automatic request from obtaining a media content item in an automatic fashion while the other playback device is obtaining media content. In other words, the management strategy of the media authority server computing machine prioritizes the manual request over the automatic request. However, according to this strategy, a media content item that is automatically streaming on device A is not interrupted when device B begins manual streaming. Instead, device A completes the currently streaming media content item but does not automatically start a next media content item.

Although the above described scenario is discussed in terms of streaming media content items, it is to be understood that such management strategies may be further applied to concurrent persistent downloading of media content items for future playback.

Figure 3:
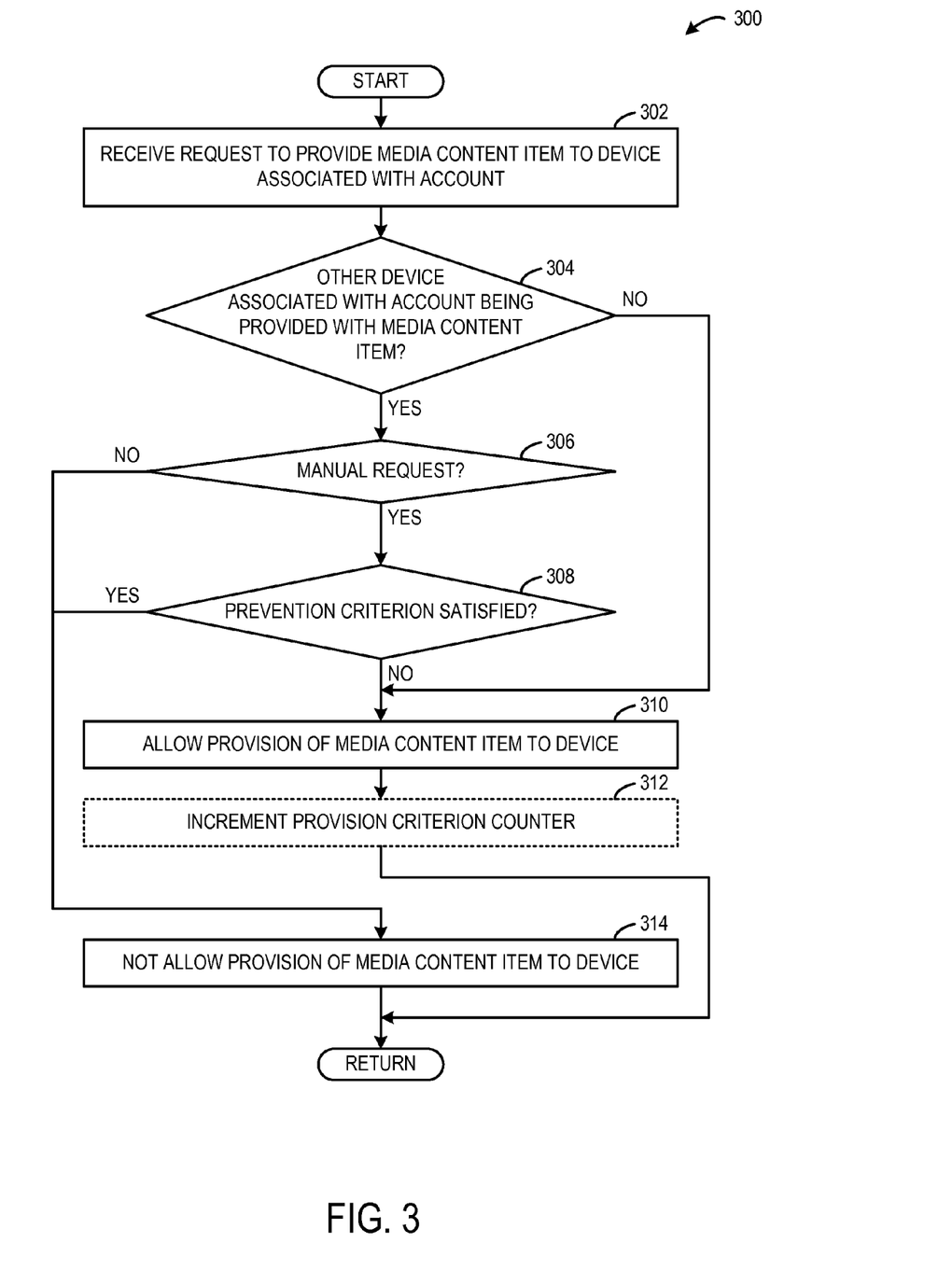
FIG. 3 shows a method for managing media delivery according to an embodiment of the present disclosure.

FIG. 3 shows a method 300 for managing media delivery according to an embodiment of the present disclosure. For example, the method 300 may be performed by the media authority computing machine 110 shown in FIG. 1.

At 302, the method 300 may include receiving a request to provide a media content item to a device associated with an account.

At 304, the method 300 may include determining whether another device associated with the account is being provided a media content item. If no other device associated with the account is being provided a media content item, then the method 300 moves to 310. Otherwise, the method 300 moves to 306.

At 306, the method 300 may include determining whether the request is a manual request. For example, the request may include an identifier or other metadata indicating whether the request is a manual request or an automatic request. In one particular example, the identifier may include a flag with a first setting that indicates that the request is an automatic request or a second setting, different than the first setting, that indicates that the request is a manual request. If the request is a manual request, then the method moves to 308. Otherwise, the method 300 moves to 314. As another example, usage data may be used to automatically assess if a request is likely to be a manual request or an automatic request. For example, if a play request is received within a time window corresponding to an anticipated ending of a previous song, the play request can be interpreted as an automatic request because it is consistent with the behavior of a device on continuous play. On the other hand, if a play request is received before or after the window, the play request can be interpreted as a manual request because it is consistent with the behavior of a device that is being manually controlled. Any suitable heuristic may be used to automatically assess if a request is likely to be a manual request or an automatic request.

At 308, the method 300 may include determining whether a prevention criterion is satisfied. For example, the prevention criterion may be a threshold number of instances of concurrent streaming within a testing period. In one particular example, the prevention criterion is five instances of concurrent streaming per hour. If the number of instances of concurrent streaming is greater than the threshold number for the testing period, then the prevention criterion is satisfied.

In some embodiments, the prevention criterion is configurable or extensible for the account or a group of accounts (e.g., all accounts for a particular country or licensing regime). For example, different accounts may have different prevention criteria. In one example, different accounts in different regions may have a different threshold number of instances of concurrent streaming within a testing period to satisfy the prevention criterion. In another example, the threshold number may decrease as the age of the account increases. In a particular example, a new account may have a threshold number of ten instances of concurrent streaming per hour and an account that is older than a month has a threshold number of five instances of concurrent streaming per hour. In another example, the prevention criterion may be adjusted according to a user's behavior. For example, a user that has previously switched between devices less frequently may be allowed a higher threshold of instances of concurrent streaming than a user that has previously switched between devices more frequently. In yet another example, the threshold may be dynamically adjusted based on media content item playback timing. For example, shorter songs may allow for more switching than longer songs. It will be appreciated that the prevention criterion may be any suitable criteria without departing from the scope of the present disclosure.

If the prevention criterion is satisfied, then the method 300 moves to 314. Otherwise, the method 300 moves 310.

At 310, the method 300 may include allowing provision of the media content item to the device. Provision of the media content item may be allowed if no other device associated with the account is being provided a media content item (answer NO to 304) or if another device associated with the account is being provided a media content item, the request is a manual request, and the prevention criterion is not satisfied (answer NO to 308). For example, allowing provision of the media content item to the device may include sending to the device information for obtaining the media content item. In some cases, sending information for obtaining the media content item includes sending information for streaming the media content item. In some cases, sending information for obtaining the media content item includes sending information for persistently downloading the media content item. For example, such information may include a pointer to a network location from which the media content item is available. In some cases, the media content item itself may be directly sent to the requesting device.

Optionally, at 312, if the prevention criterion is a threshold number of instances of concurrent streaming within a testing period, then the method 300 may include incrementing a counter that tracks the number of instances of concurrent streaming within the testing period. In some embodiments, the counter may be incremented according to playback timing of a media content item, such as a playback time of a song. In other words, if streaming starts on a second device before a song is scheduled to end on a first device, the counter will be incremented. In some embodiments, the counter may be incremented according to a message received from a playback device that playback of a media content item has concluded. In other words, a device will actually report when songs start and stop, and the counter will only be incremented if streaming starts on a second device before the first device has reported that streaming has ended. Likewise, if the first device reports that streaming has ended, the counter will not be incremented even if the second device starts streaming before the scheduled conclusion of the song that was streaming on the first device.

At 314, the method 300 may include not allowing provision of the media content item to the device. Provision of the media content item may not be allowed if another device associated with the account is being provided a media content item and the request is an automatic request. For example, not allowing provision of the media content item may include blocking the device from obtaining the media content item. In one particular example, blocking the device from obtaining the media content item includes refraining from sending to the device information for obtaining the media content item.

The above described method may be performed to allow different devices associated with the same account to concurrently obtain media content items in a limited fashion. In particular, the method may prioritize a manual request over an automatic.

Figure 4:
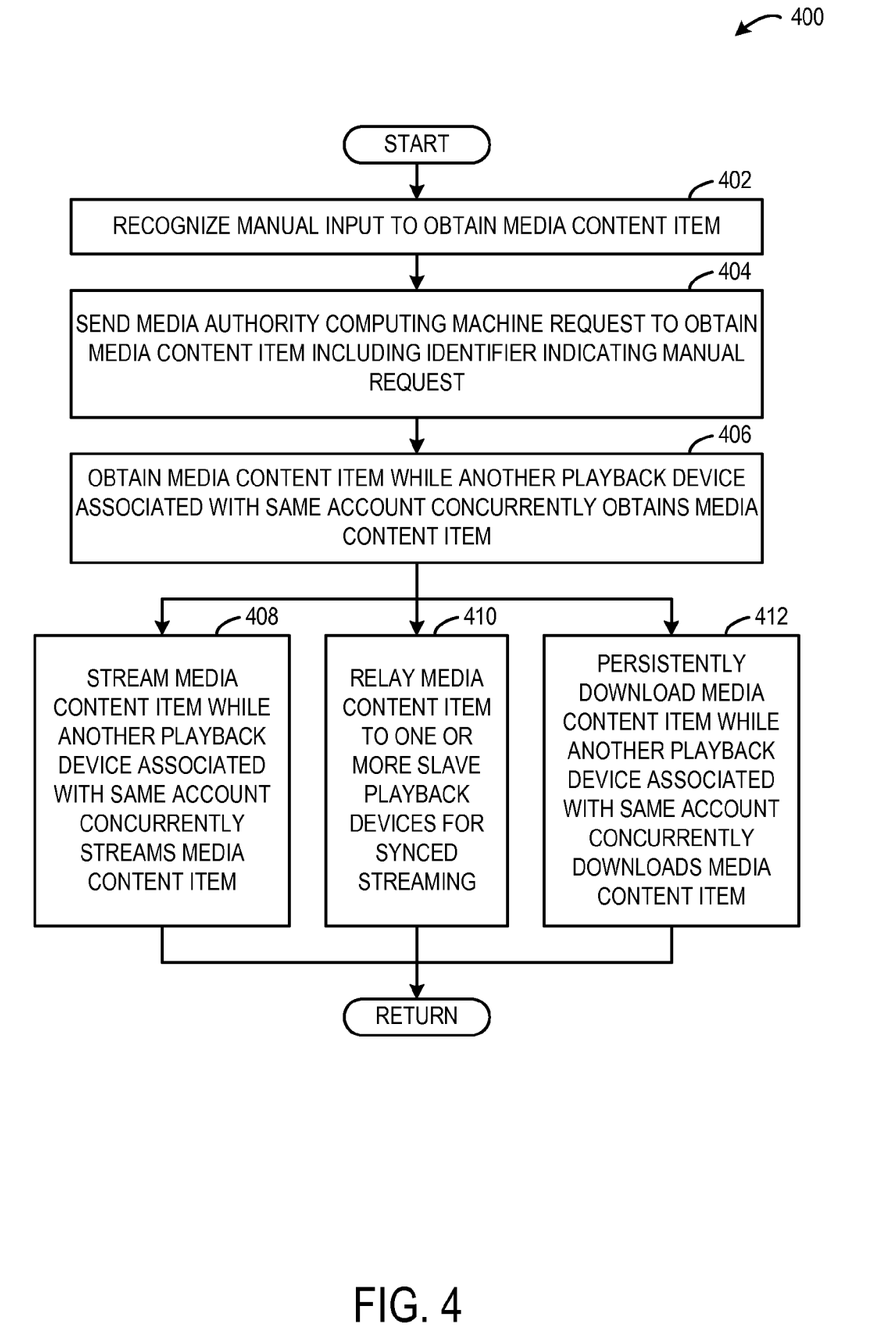
FIG. 4 shows a method of obtaining media content items with a playback device according to an embodiment of the present disclosure.

FIG. 4 shows a method 400 of obtaining media content items with a playback device according to an embodiment of the present disclosure. For example, the method 400 may be performed by a playback device of the plurality of playback devices 106 shown in FIG. 1.

At 402, the method 400 may include recognizing a manual input to obtain a media content item. For example, a manual input may include user selection of a media content item from a playlist or a library of media content. For example, the media content item may be an audio content item, such as a song. In another example, the media content item may be a video content item. In yet another example, the media content item may be a game content item.

At 404, the method 400 may include sending to a media authority computing machine a request to obtain the media content item. The request may include an identifier indicating that the request is a manual request.

At 406, the method 400 may include obtaining the media content item with the playback device while another playback device associated with a same account concurrently obtains a media content item. Once the media content item is obtained by the playback device, the playback device may perform one or more of the below described actions alone or concurrently.

At 408, the method 400 may include streaming the media content item while another playback device associated with the same account concurrently streams a media content item.

At 410, the method 400 may include relaying the media content item to one or more slave playback devices for synced streaming.

At 412, the method 400 may include persistently downloading the media content item while another playback device associated with the same account concurrently downloads a media content item.

The above method may be performed to obtain a media content item in a limited fashion while another playback device associated with the same account is concurrently obtaining a media content item. The playback device performing the method may be allowed provision of the media content item, because the playback device sends to a media authority computing device a manual request to provide a media content item. In particular, the manual request to provide the media content item may be prioritized over an automatic request to provide a media content item from another playback device associated with the same account when determining to which playback device to allow provision of a media content item.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
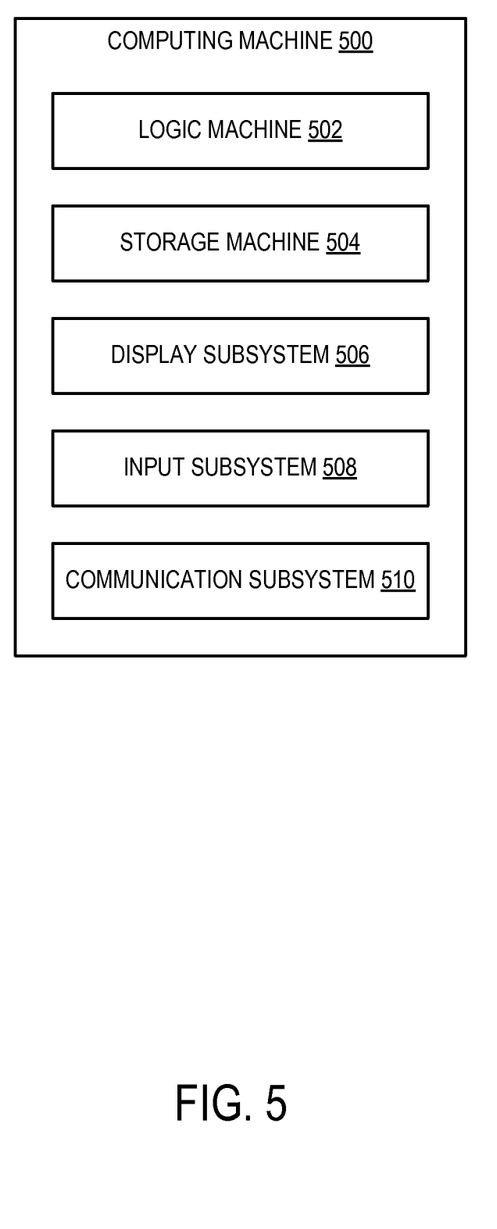
FIG. 5 shows a computing system in accordance with an embodiment of the present disclosure.

FIG. 5 schematically shows a non-limiting embodiment of a computing system 500 that can enact one or more of the methods and processes described above. For example, computing system 500 may be representative of a playback device of the plurality of playback devices 106, the media authority computing machine 110, or the media server computing machine 104 shown in FIG. 1. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, steroscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of managing media delivery from a media authority computing machine, the method comprising:
   receiving a first request from a first device associated with a first account to obtain a first media content item, wherein the first request is an automatic request;
   sending to the first device information for obtaining the first media content item;
   receiving a second request from a second device associated with the first account to obtain a second media content item, the second request including an identifier indicating that the second request is a manual request;
   sending to the second device information for obtaining the second media content item, such that obtaining the first media content item on the first device temporally overlaps obtaining the second media content item on the second device; and
   sending to the first device instructions to suspend subsequent automatic requests of media content items.

2. The method of claim 1, where sending information for obtaining the first media content item includes sending a pointer to a network location from which the media content item is available.

3. The method of claim 1, where sending information for obtaining the first media content item includes sending information for streaming the first media content item.

4. The method of claim 1, where sending information for obtaining the media content item includes sending information for persistently downloading the media content item.

5. The method of claim 1, where the media content item is an audio content item.

6. The method of claim 5, where the audio content item is a song.

7. The method of claim 1, where the media content item is a video content item.

8. The method of claim 1, where the media content item is a game content item.

9. The method of claim 1, where the first request includes an identifier including a flag with a first setting indicating that the first request is an automatic request, and where the identifier indicating that the second request is a manual request includes the flag with a second setting, different than the first setting.

10. A method of managing media delivery from a media authority computing machine, the method comprising:
    receiving a request to provide a media content item to a device associated with an account;
    when no other device associated with the account is being provided a media content item, allowing provision of the media content item to the device;
    when another device associated with the account is being provided the media content item responsive to an automatic request of the another device and the request is a manual request, allowing provision of the media content item to the device if a prevention criterion is not satisfied and sending to the another device instructions to suspend subsequent automatic requests of media content items; and
    when another device associated with the account is being provided the media content item and the request is an automatic request, not allowing provision of the media content item to the device and sending to the device instructions to suspend subsequent automatic requests of media content items.

11. The method of claim 10, where the prevention criterion is a threshold number of instances of concurrent streaming within a testing period.

12. The method of claim 10, where the prevention criterion is configurable for the account.

13. The method of claim 10, where allowing provision of the media content item to the device includes sending to the device a pointer to a network location from which the media content item is available.

14. A media authority computing machine, comprising:
    a logic machine; and
    a storage machine holding instructions executable by the logic machine, the instructions including:
        instructions to receive a first request from a first device associated with a first account to obtain a first media content item, wherein the first request is an automatic request;
        instructions to send to the first device information for obtaining the first media content item;

instructions to receive a second request from a second device associated with the first account to obtain a second media content item, the second request including an identifier indicating that the second request is a manual request;

instructions to send to the second device information for obtaining the second media content item, such that obtaining the first media content item on the first device temporally overlaps obtaining the second media content item on the second device; and instructions to send to the first device instructions to suspend subsequent automatic requests of media content items.

15. The media authority computing machine of claim 14, where instructions to send information for obtaining the first media content item include instructions to send a pointer to a network location from which the media content item is available.

16. The media authority computing machine of claim 14, where instructions to send information for obtaining the first media content item include instructions to send information for streaming the first media content item.

17. The media authority computing machine of claim 14, where instructions to send information for obtaining the media content item include instructions to send information for persistently downloading the media content item.

18. The media authority computing machine of claim 14, where the media content item is an audio content item.

19. The media authority computing machine of claim 18, where the audio content item is a song.

20. The media authority computing machine of claim 14, where the first request includes an identifier including a flag with a first setting indicating that the first request is an automatic request, and where the identifier indicating that the second request is a manual request includes the flag with a second setting, different than the first setting.

* * * * *